Dec. 30, 1969 L. SARATI 3,487,309

CIRCUITRY ADAPTED TO PERFORM DATA PROCESSING, COMBINATION AND ALARM OPERATIONS IN RECEPTION IN THE OPERATING-RESERVE SYSTEM OF ISOFREQUENCY CONNECTIONS WITH MIDDLE AND LONG-RANGE RADIO RELAYS

Filed March 14, 1966 3 Sheets-Sheet 1

INVENTOR
LUIGI SARATI
BY Young & Thompson
ATTORNEYS

Dec. 30, 1969 L. SARATI 3,487,309

CIRCUITRY ADAPTED TO PERFORM DATA PROCESSING, COMBINATION AND ALARM OPERATIONS IN RECEPTION IN THE OPERATING-RESERVE SYSTEM OF ISOFREQUENCY CONNECTIONS WITH MIDDLE AND LONG-RANGE RADIO RELAYS

Filed March 14, 1966 3 Sheets-Sheet 2

INVENTOR
LUIGI SARATI
BY Young & Thompson
ATTORNEYS

Dec. 30, 1969 L. SARATI 3,487,309

CIRCUITRY ADAPTED TO PERFORM DATA PROCESSING, COMBINATION AND ALARM OPERATIONS IN RECEPTION IN THE OPERATING-RESERVE SYSTEM OF ISOFREQUENCY CONNECTIONS WITH MIDDLE AND LONG-RANGE RADIO RELAYS

Filed March 14, 1966 3 Sheets-Sheet 3

INVENTOR
LUIGI SARATI
BY Young + Thompson
ATTORNEYS

United States Patent Office 3,487,309
Patented Dec. 30, 1969

3,487,309
CIRCUITRY ADAPTED TO PERFORM DATA PROCESSING, COMBINATION AND ALARM OPERATIONS IN RECEPTION IN THE OPERATING-RESERVE SYSTEM OF ISOFREQUENCY CONNECTIONS WITH MIDDLE AND LONG-RANGE RADIO RELAYS

Luigi Sarati, Piazzale Zavattari 4, Milan, Italy

Filed Mar. 14, 1966, Ser. No. 534,054
Claims priority, application Italy, Mar. 12, 1965, 5,486/65
Int. Cl. H04b *1/06, 7/14*
U.S. Cl. 325—2 7 Claims

ABSTRACT OF THE DISCLOSURE

The disclosure relates to an alarm circuit wherein a pair of receivers is provided, each for receiving a signal from a transmitter, each receiver providing signals for a summing circuit and also providing fault signals to an alarm signal producing means, the alarm signal producing means operating in accordance with preset logic conditions to disconnect said receivers from said summing circuit, said alarm signal producing means also providing a signal to said transmitter to provide an indication at the transmitter after a fault has existed for a predetermined time.

This invention relates to telephone and television-communications by middle and long-range radio relays, and in particular, to circuitry adapted to perform data processing, operating-reserve combination and alarm operations in the final receiving stations of such connections.

For a better understanding of the accomplishments that are attained by the present invention, reference will be made to the practice that is usually followed in the radio-relay technique. A twofold number of permanently switched-on receivers is provided in the final receiving stations of a radio relay, whereby, when a fault occurs in the operating receiver, the reserve receiver is directly substituted for the faulty one. In some cases, the necessity to have the number of carrier frequencies, as utilized in radio stations, restricted within given limits, did suggest the utilization of radio-links of so-called "operating-reserve" type, having an isofrequency reserve, i.e., of connections wherein the reserve radio-relay is operated at a carrier frequency similar to that of the currently operated radio relay.

The expensive solution of having a spatial difference connection was discarded for obvious economic reasons, whereby it became necessary to consider which combination procedure would allow the utilization of the isofrequency reserve under the best conditions of reliability.

An object of this invention is to provide circuitry in which both receivers are connected with the antenna, and their outputs are connected with a device adapted to linearly combine the two incoming signals, and possibly to shut out one of them, while keeping the level of output signal unchanged in any case (as well known, the linear combination allows the attainment of a signal-noise ratio which is 3 db better than the signal-noise ratio of the components, when the assumption is made that both component noises have a similar intensity, and are incoherent with each other can be considered as a sound one); moreover, said receivers are to be supervised in such a manner as to prevent information having a signal-noise ratio lower than a pre-established limit value from being fed to the summer.

Another object of the present invention is to provide circuitry adapted to perform combination and alarm operations on the receiving side, in the operating-reserve type of isofrequency radio-links, wherein the inputs of both receivers are permanently connected with the antenna, while the outputs thereof are both connected, under normal conditions, with a utilization device through an adding or combining device wherein the linear combination of the inputs is performed, and alarm information is respectively fed by either receiver to a data processor whenever the level of pilot tone that is coupled with the transit information drops below a pre-established level and further alarm information is given out by the same receivers whenever the signal-noise ratio of the transit information drops below a pre-established value and the first-mentioned alarm information is utilized in the data processor to give the output informations according to transducer functions, wherein certain output informations are designed to control the combiner, summer or adding device circuit for disconnecting the receivers from the utilization device while the other output information is designed to be utilized as an alarm criterion in the receiving station of radio-link, wherefrom the alarm is forwarded to the transmitting station for signalling and/or locating possible faults.

Further objects and advantages of the invention will be better appreciated from a consideration of the following description of a preferred embodiment thereof, taken with the accompanying drawings, both description and drawings given as a nonlimiting example only.

Figure 1:
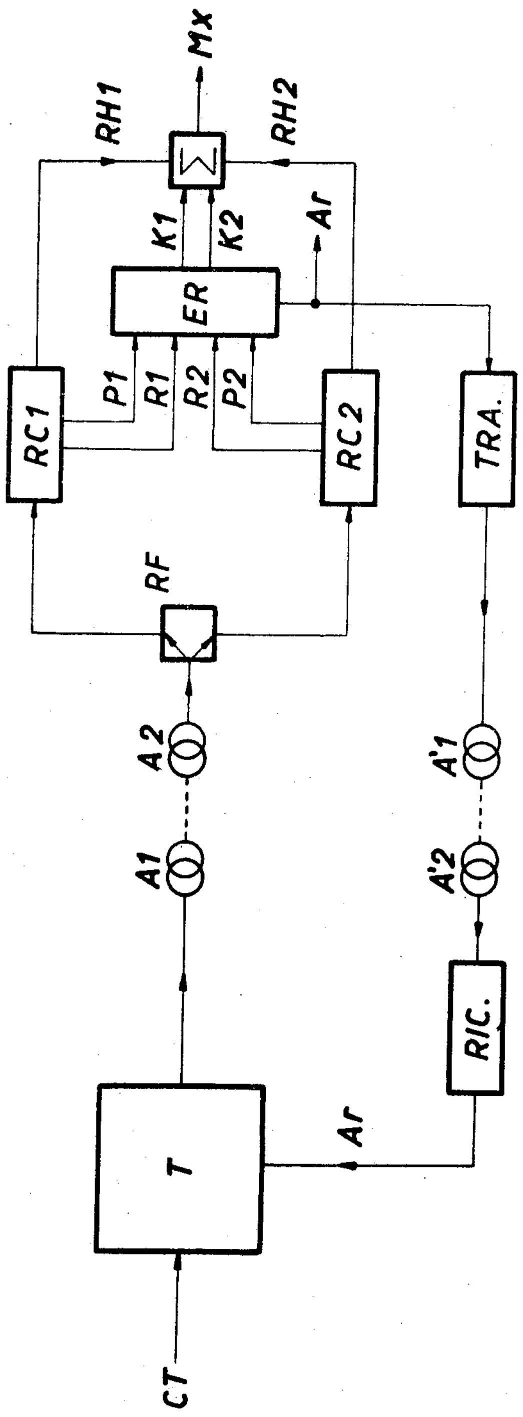
FIG. 1 is a connection diagram of the circuitry according to the invention.

As shown in the block diagram of FIG. 1, the inputs of receivers $RC_1$ and $RC_2$ are connected by means of a hybrid circuit $R_f$, with the antenna transformer $A_2$, while their outputs are connected with the utilization device $M_x$, through a linear combiner or adding device Σ. By such method, both receivers are normally utilized simultaneously. The block $E_r$ is an electronic data processing unit, and the alarm informations $P_1$, $P_2$, $R_1$, $R_2$, that are given out by control devices embodied in the receivers $R_1$ and $R_2$, are fed thereto. In fact, each receiver is controlled by two devices which respectively take knowledge of the noise level that comes with the transit information and of the pilot tone that is introduced in the transmission to control the continuity of connection.

In case of faulty service, the alarm informations $P_1$, $P_2$, $R_1$, $R_2$ are fed, by the above devices, to the receiving data processor $E_r$, thereby triggering it according to a preestablished program. In fact, said data processor provides, if required, for having the summing device Σ operated in such a manner as to disconnect the faulty receiver $RC_1$ or $RC_2$.

In addition to the above-described operations, the receiving data processor $E_r$ also provides for determining the particular condition which occurs when the alarm condition persists in both receivers $RC_1$ and $RC_2$ for more than a preestablished time limit. Such condition is usually indicative of a fault in the transmitting station since it is not likely that both receivers $RC_1$ and $RC_2$ are faulty. When the transmitting station T is of the operating-reserve type and thus equipped with control and switching devices adapted to detect possible faults in the operating transmitter and accordingly to have the transmission switched over onto the reserve transmitter, the persistence of alarm conditions simultaneously in $RC_1$ and $RC_2$ for more than the pre-established time limits is indicative of a nonintervention of the protection devices in transmitter T. Said condition is thus made known by means of the transmission of signal $A_r$ to the transmitting station T. In FIG. 1, TRA is the transmission unit by which the signal $A_r$ is transmitted; $A_1'$ and $A_2'$ respectively are the transformers of receiving antenna and of transmitting antenna, and RIC is the receiving unit. See U.S. Patent No. 3,421,145 for further description of T and RIC. The signal $A_r$ is simultaneously fed also to the receiving section of the radio-link.

The degree of reliability of operating-reserve connections can be improved by the use of the above-stated protections, since, due to the action thereof, possible breaks might occur only when heavy faults would simultaneously take place in both transmitters or in both receivers.

As previously stated, two kinds of informations $P_1$ and $R_1$, coming from the control devices as embodied in both receivers $RC_1$, $RC_2$, are utilized by the electronic data processor $E_r$. Said two alarm informations are indicative of the hereinafter stated conditions:

$R_1$=Increase in the noise that comes with the useful information when a pre-established limit value is exceeded (such information can be obtained by means of an express noise detector having a well-defined band width, or by referring to AGC-voltage of the IF amplifier. The alarm information is forwarded to data processor $E_r$, e.g., when the noise results in a signal-noise ratio smaller than 30 db. at the output of receiver).

$P_1$=Decrease, over a given-pre-established value (e.g. $\leq$6 db.) in the level of received pilot tone. As stated previously, the summing device $\Sigma$ is controlled, when receiving, by the data processor $E_r$, in such a manner as to attain the best utilization of signals coming from both receivers $RC_1$ and $RC_2$. This can be obtained when the hereinafter stated conditions are maintained:

(1) When both receivers $RC_1$ and $RC_2$ are in proper working conditions, the signals present at their outputs can be linearly added with one another. In fact, in such a case, since the connection is of the isofrequency type, the signal-noise ratio present at the output of summing device $\Sigma$, is 3 db. higher than that of the component signals.

(2) When one of receivers $RC_1$ and $RC_2$ is faulty, the transit from its output and the summing device $\Sigma$ shall be discontinued. At the same time, the output of $\Sigma$ is to be shortcircuited onto the output of the other receiver.

(3) When an alarm condition is simultaneously detected on both receivers $RC_1$ and $RC_2$, due to an excess of noise $R_1$, $R_2$ then the connections between both receiver outputs and the summing circuit are to be both broken, to prevent too high noises from reaching the utilization device $M_x$.

Figure 3:
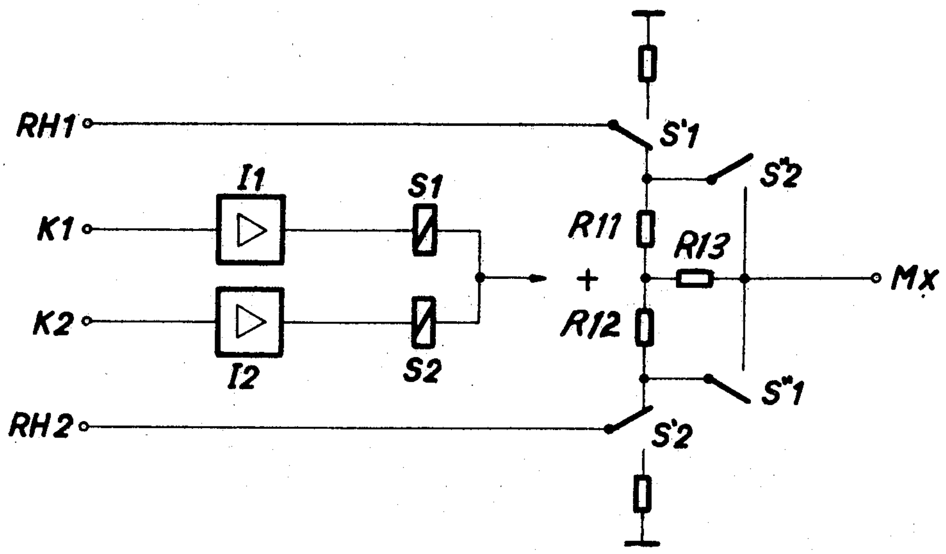
FIG. 3 is an embodiment of adding device Σ, as shown in FIG. 1.

The above conditions can be maintained by the circuitry as diagrammatically shown in FIG. 3, and wherein the summing device $\Sigma$ circuitry is clearly set forth in detail. As can be readily appreciated from a consideration of said circuit diagram, the outputs $K_1$ and $K_2$ of the hepta-pole Er shall be activated, when the transit from the output $RH_1$ or $RH_2$, to the resistive adder, consisting of the resistances $R_{11}$, $R_{12}$ and $R_{13}$, is to be discontinued. By the activation of either outputs $K_1$, $K_2$, the related relay $S_1$ or $S_2$ is energized, whereby their contacts $S_1'$, $S_1''$, or $S_2$, $S_2''$ are switched over, thus cutting the receiver $RC_1$ or $RC_2$, which is under alarm conditions, out of the utilizer device, and shortcuiting at the same time the resistive adder.

Let us consider now the operation of data processor $E_r$. In respect of the four incoming information signals, the logical operation of receiving data processor can be summarized by the following relations:

$$K_1=R_1+P_1\cdot(\overline{R_2+P_2})$$
$$K_2=R_2+P_2\cdot(\overline{R_1+P_1})$$
$$A_r=[(P_1+R_1)\cdot(P_2+R_2)]_{(\tau)}$$

When both receivers $RC_1$ and $RC_2$ are faulty, the general alarm information is present on the output $A_r$. However, such information is forwarded only when the simultaneous faulty condition of said two receivers lasts over a given time limit $\tau$.

Figure 2:
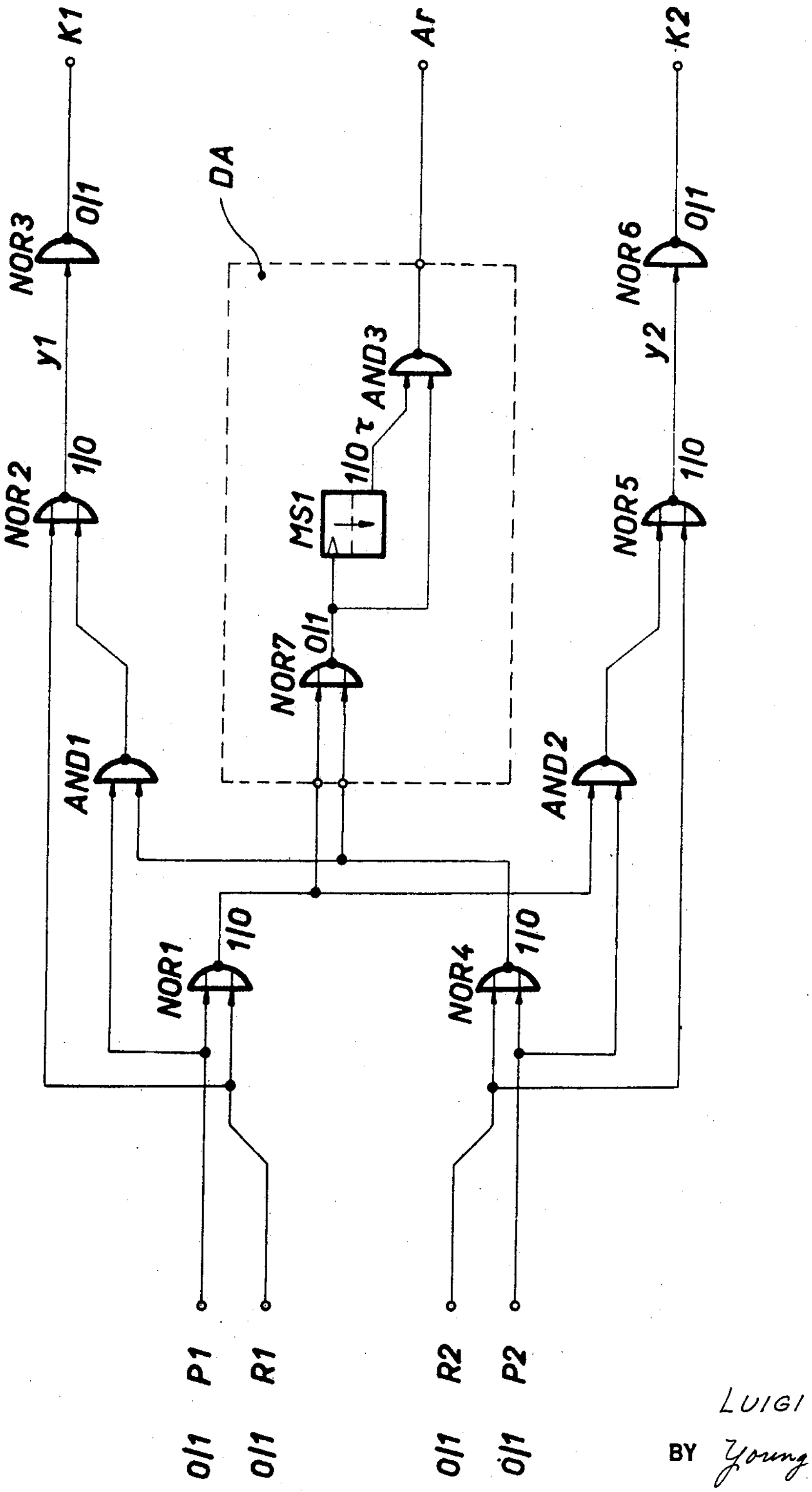
FIG. 2 is an embodiment of data processor ($E_r$) as shown in FIG. 1.

The above-stated relations can be obtained by means of the logical circuit as shown in FIG. 2. As it can be noticed therefrom, recourse is to be made to seven NOR-circuits, three AND-circuits and one monostable multivibrator $MS_1$ for the realization of said logical circuit. The monostable multivibrator $MS_1$ is utilized to provide the alarm signal $A_r$ only after a time delay $\tau$.

Three examples of faulty conditions which can occur in the radio connection are quoted hereinafter, to better explain the operation of data processor $E_r$.

EXAMPLE 1

Assuming the pilot receiver pertaining to the first radio receiver $RC_1$ to be under alarm conditions, in such a case, the input $P_1$ of NOR1 is switched from the "zero state," over to the "one state" and consequently its output will be switched from the one state, over to the zero state. The information coming from receiver $RC_1$ is simultaneously forwarded to AND1 circuit, both inputs of which will be, in such a case, in the one state. In fact, no alarm signal has been forwarded from the second receiver $RC_2$, whereby the output of NOR4, connected with the second input of AND1 is still in the one state. Since both inputs of AND1 are now in the one state, the output thereof will be also in the one state, and consequently the output of NOR2 is switched from the one state over the zero state. Since the output of NOR2 is connected to NOR3, it follows that the output of said NOR3 is switched from the zero state to the one state which results in giving an order to isolate the output of the first receiver $RC_1$ from the summing device.

Considering now which may be the operating condition wherein a response of alarm device $D_a$ is obtained, under normal conditions the outputs of NOR1 and NOR4, that are connected with both inputs of NOR7 are in the one state whereby the output of NOR7 is in the zero state. When the first receiver became faulty, the input $P_1$ is changed from the zero state to the one state and consequently also the output of NOR1 was moved from the one state to the zero state. Since no changes have occurred in the state of NOR4 output, no variations can take place in the output of NOR7, whereby the alarm device $D_a$ cannot give any response.

EXAMPLE 2

The behavior of the data processor $E_r$, when both radio receivers are under alarm conditions, is considered in this second example. With regard to signals $P_1$ and $P_2$ only, assuming that both inputs $P_1$ and $P_2$ are transmitted from the zero state to the one state, in such a case, both outputs of NOR1 and NOR4 are converted from the one state to the zero state. As conseqeucnes of such condition, the hereinafter-stated situation follows:

(a) The signs of inputs of the circuits AND1 and AND2 are opposite to each other; in fact, when considering e.g. the circuit AND1, the first input (which is directly connected with the input $P_1$) is in the one state while the second input (which is connected with the output of NOR4) is in the zero state. Under such condition, the output of AND1 will stay in the zero state and thus no change occurs in the state of output $K_1$, whereby no switching-over order is given. Similarly, no change occurs in the output $K_2$.

(b) The two inputs of NOR7—that are respectively connected with the outputs of NOR1 and NOR4—are both in the zero state and thus the output thereof is transmitted from the zero state to the one state. Such change in the state results in an excitation of monostable multivibrator MS1 which after its characteristic relaxation time $\tau$, that is set on a value greater than the time required for the switching over of transmitting section, provides for changing its output (that is connected with the first input of AND3) from the zero state to the one state. Should in the meantime the transmitting section be switched over, whereby the alarm informations $P_1$ and $P_2$ have come back in their normal conditions, then also the output of NOR7 will have come back to zero state, while if no change has occurred in the state of inputs $P_1$ and $P_2$, the output of NOR7 also stays in the one state. Now, since latter output is also connected with the second input of AND3, the output thereof is converted from the zero state to the one state, thus giving the alarm condition $A_r$. Obviously, such alarm condition stays as long as the outputs of NOR1 and NOR4 are kept in the zero state.

EXAMPLE 3

The behavior of data processor, when an alarm condition $R_1$ or $R_2$ occurs, due to an increase over a given limit value, in the noise that goes with the useful information, will be considered in this example.

In such a case, which results in a change from the zero state to the one state of the inputs $R_1$ or $R_2$, since the latter inputs are respectively connected with the first input of NOR2, and with the second input of NOR5, it follows that the inputs of following NOR3 and NOR6 shall be changed whenever and $R_1$ or $R_2$ alarm condition is detected in the related receiver. And since a change in the state of respective outputs of NOR2 and of NOR5 results in a change in the state of NOR3 and respectively of NOR6, it follows that the controls $K_1$ and/or $K_2$ are always brought into action as a consequence of the presence of related alarms $R_1$ and/or $R_2$. Should two noise alarms simultaneously occur, then the behavior of alarm device $D_a$ would be similar to that as stated in Example 2 as well as in Example 3 for $K_1$ and $K_2$.

Though the invention has been described with respect to a preferred embodiment thereof, many variations and modifications thereof will immediately become apparent to those skilled in the art. It is therefore the intention that the appended claims be interpreted as broadly as possible in view of the prior art to include all such vatriations and modifications.

Having described my invention, I claim:

1. An alarm circuit for use in operation-reserve systems of isofrequency radio connections comprising, in combination, receiving means including first and second receivers for receiving transmitted signals from a transmitter means, output means connected to receive outputs from said first and second receivers, each of said receivers including first means for providing first fault signals $P_1$ and $P_2$ from said first and second receivers respectively in response to a first fault condition and second means for providing second fault signals $R_1$ and $R_2$ from said first and second receivers respectively in response to a second fault condition, alarm signal producing means connected to receive said fault signals $P_1$, $P_2$, $R_1$, and $R_2$, said alarm signal producing means operating to provide an output signal $K_1$ upon receipt thereby of either a fault signal $P_1$ in the absence of a fault signal $P_2$ and fault signal $R_2$ or a fault signal $R_1$; and an output signal $K_2$ upon receipt thereby of either a fault signal $P_2$ in the absence of a fault signal $P_1$ and fault signal $R_1$ or, a fault signal $R_2$, and alarm signal responsive means connected to receive signals $K_1$ and $K_2$, said alarm signal responsive means operating in response to signal $K_1$ to disconnect said first receiver from said output means and in response to signal $K_2$ to disconnect said second receiver from said output means.

2. The alarm circuit as set forth in claim 1 wherein said receiving means includes an antenna system, having a single antenna, said first and second receivers being normally operative in the absence of said first and second fault signals to concurrently receive signals from said single antenna and provide output signals to said output means, said output means operating to combine said output signals.

3. The alarm circuit as set forth in claim 1 wherein said alarm signal producing means operates in response to concurrent receipt thereby for a predetermined time of either fault signals $P_1$ and $P_2$ or $R_1$ and $R_2$ to provide an output signal $A_r$, said alarm circuit including transmitting means operative in response to said output signal $A_r$.

4. An alarm circuit as set forth in claim 1 wherein said alarm signal producing means includes a first NOR circuit responsive to said $P_1$ and $R_1$ fault signals, a fourth NOR circuit responsive to said $R_2$ and $P_2$ fault signals, a first AND circuit responsive to said $P_1$ signal and the output of said fourth NOR circuit, a second NOR circuit responsive to said $R_1$ signal and the output of said first AND circuit, a third NOR circuit responsive to the output of said second NOR circuit to provide said $K_1$ signal, a second AND circuit responsive to said $P_2$ signal and the output of said first NOR circuit, a fifth NOR circuit responsive to said $R_2$ signal and the output of said second AND circuit and a sixth NOR circuit responsive to the output of said fifth NOR circuit for providing said $K_2$ signal.

5. An alarm circuit as set forth in claim 3 wherein said alarm signal producing means includes a first NOR circuit responsive to said $P_1$ and $R_1$ fault signals, a fourth NOR circuit responsive to said $R_2$ and $P_2$ fault signals, a first AND circuit responsive to said $P_1$ signal and the output of said fourth NOR circuit, a second NOR circuit responsive to said $R_1$ signal and the output of said first AND circuit, a third NOR circuit responsive to the output of said second NOR circuit to provide said $K^1$ signal, a second AND circuit responsive to said $P_2$ signal and the output of said first NOR circuit, a fifth NOR circuit responsive to said $R_2$ signal and the output of said second AND circuit and a sixth NOR circuit responsive to the output of said fifth NOR circuit for providing said $K_2$ signal.

6. An alarm circuit as set forth in claim 4 further including a seventh NOR circuit responsive to the output of said first and said fourth NOR circuits, means responsive to a predetermined output from said seventh NOR circuit for providing an output signal, said last-mentioned means providing said signal after a predetermined time delay and a third AND circuit responsive to the output of said seventh NOR circuit and said third AND circuit to provide said $A_r$ signal.

7. An alarm circuit as set forth in claim 5 further including a seventh NOR circuit responsive to the output of said first and said fourth NOR circuits, means responsive to a predetermined output from said seventh NOR circuit for providing an output signal, said last-mentioned means providing said signal after a predetermined time delay and a third AND circuit responsive to the output of said seventh NOR circuit and said third AND circuit to provide said $A_r$ signal.

References Cited

UNITED STATES PATENTS

| | | | |
|---|---|---|---|
| 2,892,930 | 6/1959 | Magnuski et al. | 325—56 |
| 2,947,861 | 8/1960 | Ulstad et al. | 325—305 |
| 3,003,031 | 10/1961 | Posthumus | 178—69 |
| 3,048,840 | 8/1962 | Ferrar et al. | 343—100 |
| 3,204,204 | 8/1965 | Buxton et al. | 178—69 X |
| 3,296,532 | 1/1967 | Robinson | 325—305 |

ROBERT L. GRIFFIN, Primary Examiner

BENEDICT V. SAFOUREK, Assistant Examiner

U.S. Cl. X.R.

325—56, 304, 305; 340—147